United States Patent
Long et al.

(10) Patent No.: US 11,204,531 B2
(45) Date of Patent: Dec. 21, 2021

(54) ARRAY SUBSTRATE, MANUFACTURING METHOD THEREOF, AND DISPLAY PANEL

(71) Applicant: BOE TECHNOLOGY GROUP CO., LTD., Beijing (CN)

(72) Inventors: Chunping Long, Beijing (CN); Yong Qiao, Beijing (CN); Xinyin Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 39 days.

(21) Appl. No.: 16/476,191

(22) PCT Filed: Oct. 10, 2018

(86) PCT No.: PCT/CN2018/109620
§ 371 (c)(1),
(2) Date: Jul. 5, 2019

(87) PCT Pub. No.: WO2019/085715
PCT Pub. Date: May 9, 2019

(65) Prior Publication Data
US 2020/0026136 A1    Jan. 23, 2020

(30) Foreign Application Priority Data
Nov. 6, 2017  (CN) .......................... 201721462164.1

(51) Int. Cl.
*G02F 1/1362*    (2006.01)
*G02F 1/1345*    (2006.01)

(52) U.S. Cl.
CPC ...... *G02F 1/136286* (2013.01); *G02F 1/1345* (2013.01); *G02F 1/136227* (2013.01); *G02F 1/136218* (2021.01)

(58) Field of Classification Search
CPC .................................................. G02F 1/136286
See application file for complete search history.

(56) References Cited

U.S. PATENT DOCUMENTS 7,576,824 B2    8/2009  Kim
2003/0184699 A1*  10/2003  Matsumoto ....... G02F 1/134363
                                                      349/141
(Continued)

FOREIGN PATENT DOCUMENTS

CN          1797156 A      7/2006
CN          205450519      * 8/2016
(Continued)

OTHER PUBLICATIONS

International Search Report dated Jan. 4, 2019, of corresponding PCT/CN2018/109620 with English translation.

*Primary Examiner* — Sang V Nguyen
(74) *Attorney, Agent, or Firm* — Nath, Goldberg & Meyer; Joshua B. Goldberg

(57) ABSTRACT

The present disclosure provides an array substrate and a display panel, where the array substrate includes: a plurality of pixel structures, each of the pixel structures comprises at least one pixel region, wherein a signal wire is provided at a side of the pixel region, and a pixel electrode is provided in the pixel region, a shield electrode being in a same layer as the pixel electrode is provided at a side of the pixel electrode proximal to the signal wire, and the shield electrode is electrically coupled to a common electrode line. The technical solution of the present disclosure can improve the chaos in electric field at the edge of the area of the pixel region between the pixel electrode and the signal wire, and it is beneficial to reduce light leakage and increase the aperture ratio.

18 Claims, 4 Drawing Sheets

(56) References Cited

U.S. PATENT DOCUMENTS

| | | | | |
|---|---|---|---|---|
| 2006/0146254 A1* | 7/2006 | Kim | ................ | G02F 1/134363 |
| | | | | 349/141 |
| 2009/0002294 A1* | 1/2009 | Horiguchi | ......... | G02F 1/134363 |
| | | | | 345/87 |
| 2009/0279027 A1* | 11/2009 | Nishida | ............. | G02F 1/133555 |
| | | | | 349/114 |
| 2014/0043552 A1* | 2/2014 | Chang | ................ | G02F 1/136286 |
| | | | | 349/43 |
| 2015/0177578 A1* | 6/2015 | Uramoto | ........... | G02F 1/134363 |
| | | | | 349/34 |
| 2016/0202582 A1 | 7/2016 | Paek et al. | | |
| 2016/0252793 A1* | 9/2016 | Cheng | ............... | H01L 29/66765 |
| | | | | 257/72 |
| 2017/0212375 A1* | 7/2017 | Yan | ................... | H01L 29/78645 |
| 2018/0113365 A1* | 4/2018 | Li | ...................... | G02F 1/136286 |
| 2018/0197900 A1* | 7/2018 | Deng | .................. | H01L 29/7869 |
| 2018/0374955 A1* | 12/2018 | Yoshida | .............. | H01L 29/7869 |
| 2019/0278144 A1* | 9/2019 | Hosokawa | .......... | G06F 3/04164 |
| 2020/0033680 A1* | 1/2020 | Ye | ..................... | G02F 1/136209 |

FOREIGN PATENT DOCUMENTS

| | | | | | |
|---|---|---|---|---|---|
| CN | 205450519 U | * | 8/2016 | ........... | G02F 1/1362 |
| CN | 205450519 U | | 8/2016 | | |
| CN | 206096715 U | | 4/2017 | | |
| CN | 106773394 | * | 5/2017 | ........... | G02F 1/1343 |
| CN | 106773394 A | * | 5/2017 | ........... | G02F 1/1343 |
| CN | 106773394 A | | 5/2017 | | |
| CN | 207337026 U | | 5/2018 | | |

* cited by examiner providing the shield electrode in a same layer as the pixel electrode at a side of the pixel electrode proximal to the signal wire, wherein the shield electrode is electrically coupled to the common electrode line — 701

ARRAY SUBSTRATE, MANUFACTURING METHOD THEREOF, AND DISPLAY PANEL

CROSS-REFERENCE TO RELATED APPLICATION

This is a National Phase Application filed under 35 U.S.C. 371 as a national stage of PCT/CN2018/109620, filed Oct. 10, 2018, an application claiming the benefit of Chinese Patent Publication No. 201721462164.1, filed on Nov. 6, 2017, the disclosure of each of which is hereby incorporated by reference.

TECHNICAL FIELD

The present disclosure relates to the field of display technology, and in particular, to an array substrate and a manufacturing method thereof, and a display panel.

BACKGROUND

Display devices have been widely used as display screens for consumer electronics such as cell phones, notebook computers, personal computers, and personal digital assistants. A display device typically includes an active matrix array substrate in which light beam intensity is adjusted by using active components to display an image. The array substrate includes a plurality of gate lines, a plurality of data lines, and a plurality of pixel structures electrically coupled to the respective gate lines and data lines, each of the pixel structures individually controls light transmittance by a thin film transistor.

SUMMARY

An embodiment of the present disclosure provides an array substrate, including: a plurality of pixel structures, each of the pixel structures includes at least one pixel region, wherein a signal wire is provided at a side of the pixel region, and a pixel electrode is provided in the pixel region, a shield electrode being in a same layer as the pixel electrode is provided at a side of the pixel electrode proximal to the signal wire, and the shield electrode is electrically coupled to a common electrode line.

In some implementations, the signal wire includes a gate line and/or the common electrode line.

In some implementations, the signal wire is the common electrode line, and the shield electrode includes a first shield sub-electrode, and the first shield sub-electrode is coupled to the common electrode line through a via hole.

In some implementations, the signal wire is the gate line, the shield electrode includes a second shield sub-electrode located in the pixel region; the pixel region further includes a common electrode, and the common electrode is electrically coupled to the common electrode line; and the second shield sub-electrode is electrically coupled to the common electrode.

In some implementations, the signal wire is the gate line, the shield electrode includes a third shield sub-electrode, an orthographic projection of the third shield sub-electrode on a plane where the gate line is located is completely in an area where the gate line is located; the pixel region further includes a common electrode, and the common electrode is electrically coupled to the common electrode line; and the third shield sub-electrode is electrically coupled to the common electrode.

In some implementations, the signal wire includes the common electrode line and the gate line, the shield electrode includes a first shield sub-electrode and a second shield sub-electrode, the first shield sub-electrode is coupled to the common electrode line through a via hole, and the second shield sub-electrode is located in the pixel region; the pixel region further includes a common electrode, and the common electrode is electrically coupled to the common electrode line; and the second shield sub-electrode is electrically coupled to the common electrode.

In some implementations, the signal wire includes the common electrode line and the gate line, the shield electrode includes a first shield sub-electrode and a third shield sub-electrode, the first shield sub-electrode is coupled to the common electrode line through a via hole, and an orthographic projection of the third shield sub-electrode on a plane where the gate line is located is completely within an area where the gate line is located; the pixel region further includes a common electrode, and the common electrode is electrically coupled to the common electrode line; and the third shield sub-electrode is electrically coupled to the common electrode.

In some implementations, the common electrode is in a same layer as the pixel electrode, and the shield electrode is directly coupled to the common electrode.

In some implementations, the common electrode is a comb-shaped electrode, and the common electrode includes a plurality of first comb tooth portions, a shape and an arrangement direction of the shield electrode are the same as a shape and an arrangement direction of the first comb tooth portions.

In some implementations, the pixel structure includes two pixel regions and a gate line between the two pixel regions, and the two pixel regions share the gate line.

In some implementations, the pixel structure includes two pixel regions, and the two pixel regions are disposed along a first direction; the pixel region includes a data line at a side of the pixel region parallel to the first direction, and the two pixel regions share the data line.

In some implementations, the pixel electrode is a comb-shaped electrode.

In some implementations, the array substrate further includes at least one thin film transistor corresponding to the at least one pixel region in one-to-one correspondence relationship.

An embodiment of the present disclosure provides a display panel, including the above array panel.

An embodiment of the present disclosure provides a manufacturing method of the array substrate, the array substrate includes a plurality of pixel structures, each of the pixel structures includes at least one pixel region, a signal wire is provided at a side of the pixel region, and a pixel electrode is provided in the pixel region, the manufacturing method including: providing a shield electrode in a same layer as the pixel electrode at a side of the pixel electrode proximal to the signal wire, wherein the shield electrode is electrically coupled to the common electrode line.

In some implementations, the signal wire is the common electrode line, the shield electrode includes a first shield sub-electrode, and the manufacturing method further includes: electrically coupling the first shield sub-electrode to the common electrode line through a via hole.

In some implementations, the signal wire is the gate line, the shield electrode includes a second shield sub-electrode, and the second shield sub-electrode is located in the pixel region, the pixel region further includes a common electrode, and the manufacturing method further includes: electrically coupling the common electrode to the common electrode line; and electrically coupling the second shield sub-electrode to the common electrode.

In some implementations, the signal wire is the gate line, the shield electrode includes a third shield sub-electrode, and the third shield sub-electrode is located outside the pixel region, an orthographic projection of the third shield sub-electrode on a plane where the gate line is located is completely in an area where the gate line is located, and the pixel region further includes a common electrode, and the manufacturing method further includes: electrically coupling the common electrode to the common electrode line; and electrically coupling the third shield sub-electrode to the common electrode.

In some implementations, the signal wire includes the common electrode line and the gate line, the shield electrode includes a first shield sub-electrode and a second shield sub-electrode, the second shield sub-electrode is located in the pixel region, the pixel region further includes a common electrode, and the manufacturing method further includes: coupling the first shield sub-electrode to the common electrode line through a via hole; electrically coupling the common electrode to the common electrode line; and electrically coupling the second shield sub-electrode to the common electrode.

In some implementations, the signal wire includes the common electrode line and the gate line, the shield electrode includes a first shield sub-electrode and a third shield sub-electrode, an orthographic projection of the third shield sub-electrode on a plane where the gate line is located is completely in an area where the gate line is located, and the pixel region further includes a common electrode, and the manufacturing method further includes: electrically coupling the first shield sub-electrode to the common electrode line through a via hole; electrically coupling the common electrode to the common electrode line; and electrically coupling the third shield sub-electrode to the common electrode.

DETAILED DESCRIPTION

In order to enable those skilled in the art to better understand the technical solutions of the present disclosure, an array substrate and a manufacturing method thereof and a display panel provided by the present disclosure are described in detail below with reference to the accompanying drawings.

Figure 1:
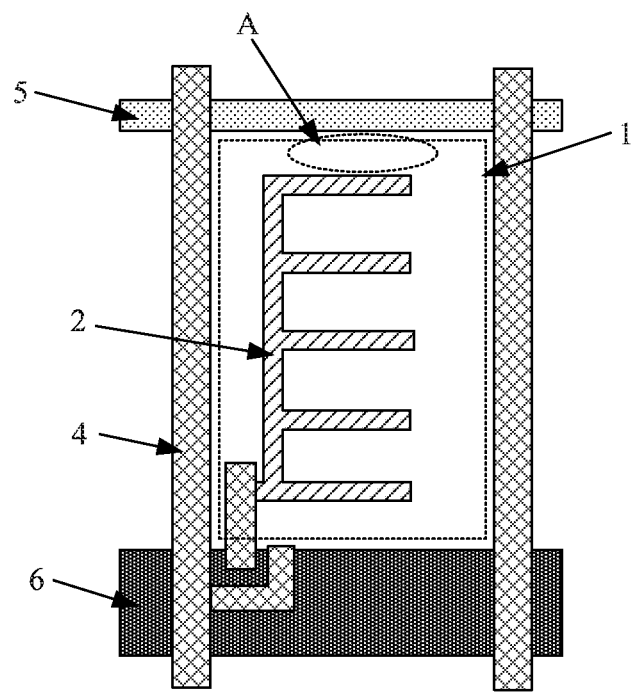
FIG. 1 is a top view of a pixel structure in an array substrate in the related art.

FIG. 1 is a top view of a pixel structure in an array substrate in the related art. As shown in FIG. 1, the array substrate generally includes a plurality of pixel structures, and each of the pixel structures includes a pixel region 1, wherein the pixel region 1 is a region surrounded by a common electrode line 5 and a gate line 6, which are opposite to each other, and two adjacent parallel data lines 4. The pixel region 1 is provided with a pixel electrode 2 therein. An electric field is formed between the pixel electrode 2 and a common electrode provided on the array substrate or an opposite substrate so as to control the rotation of the liquid crystal molecules, thereby controlling the light transmittance.

In practical applications, a fringe electric field may be formed between the pixel electrode 2 and the common electrode line 5 (which is disposed in a same layer as the gate line 6 and disposed in a different layer from the pixel electrode 2), and the fringe electric field may cause chaos in electric field in an area A of the pixel region 1 between the pixel electrode 2 and the common electrode line 5, and light leakage is likely to occur.

For this reason, in the related art, a black matrix is often provided in the area between the pixel electrode and the common electrode to block light so as to avoid light leakage. However, the providing of the black matrix may cause the aperture ratio of the pixel region to decrease.

Figure 2:
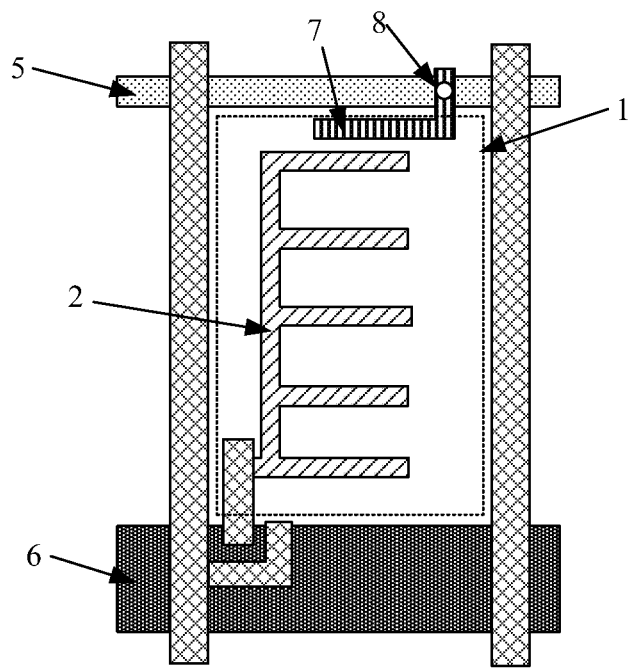
FIG. 2 is a top view of a pixel structure in an array substrate according to an embodiment of the present disclosure.

FIG. 2 is a top view of a pixel structure in an array substrate according to an embodiment of the present disclosure. As shown in FIG. 2, the array substrate includes a plurality of pixel structures, each of the pixel structures includes at least one pixel region 1, a signal wire is provided at a side of the pixel region 1, and the pixel region 1 is provided with a pixel electrode 2 therein, a shield electrode disposed in a same layer as the pixel electrode is provided at a side of the pixel electrode 2 proximal to the signal wire, and the shield electrode is electrically coupled to the common electrode line.

It should be noted that, in FIG. 2, only a case where one pixel structure includes one pixel region 1 is exemplarily illustrated, which does not limit the technical solution of the present disclosure.

In the present embodiment, by providing the shield electrode disposed in a same layer as the pixel electrode 2 at a side of the pixel electrode 2 proximal to the signal wire, and coupling the shield electrode to the common electrode line, a planar electric field can be formed between the shield electrode and the pixel electrode 2, the planar electric field can effectively shield the fringe electric field formed between the pixel electrode 2 and the signal wire 5 located outside the pixel region 1 to prevent the fringe electric field from affecting the liquid crystal molecules, thereby improving the chaos in electric field at the edge of an area of the pixel region 1 between the pixel electrode 2 and the signal wire, which is advantageous for reducing light leakage and increasing the aperture ratio.

Continuing to refer to FIG. 2, as a specific implementation, taking the signal wire being the common electrode line 5 as an example, the shield electrode at a side of the pixel electrode 2 proximal to the common electrode line 5 is a first shield sub-electrode 7, the first shield sub-electrode 7 is disposed in a same layer as the pixel electrode 2 and is coupled to the common electrode line 5 through the via hole 8.

In the present disclosure, by providing the first shield sub-electrode 7 between the pixel electrode 2 and the common electrode line 5, the first shield sub-electrode 7 is disposed in the same layer as the pixel electrode 2 and coupled to the common electrode line 5 through the via hole, a planar electric field (parallel to the plane in which the pixel electrode 2 is located) may be formed between the first shield sub-electrode 7 and the pixel electrode 2, the planar electric field can effectively eliminate the influence of the fringe electric field formed between the pixel electrode 2 and the common electrode line 5 on the liquid crystal molecules, thereby improving the chaos in electric field at the edge of the area of the pixel region 1 between the pixel electrode 2 and the common electrode line 5, which is advantageous for reducing light leakage and increasing the aperture ratio.

It should be noted that since the voltage on the first shield sub-electrode 7 is the same as the voltage on the common electrode line 5, no fringe electric field is formed between the first shield sub-electrode 7 and the common electrode line 5.

Figure 3:
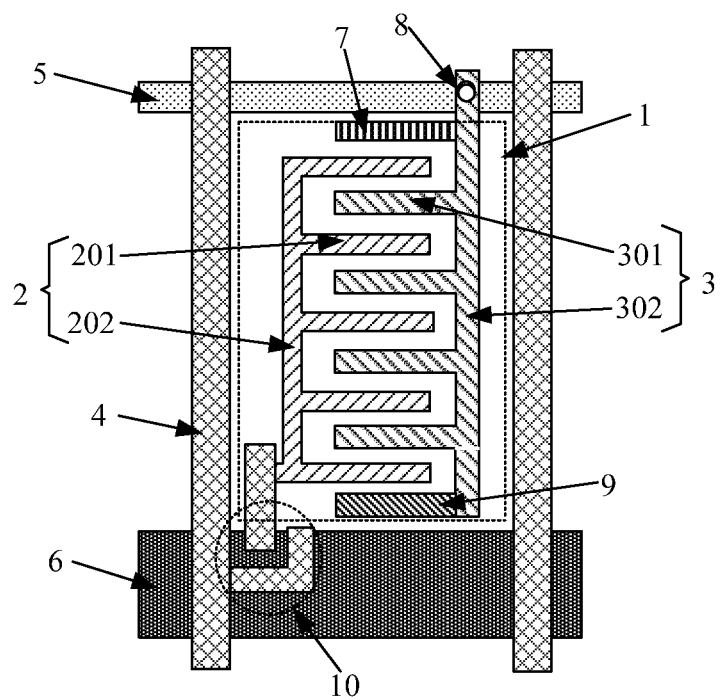
FIG. 3 is a top view of a pixel structure in an array substrate according to an embodiment of the present disclosure.

FIG. 3 is a top view of a pixel structure in an array substrate according to an embodiment of the present disclosure. As shown in FIG. 3, in the present embodiment, the signal wire is a gate line 6, and the shield electrode at a side of the pixel electrode 2 proximal to the gate line 6 is a second shield sub-electrode 9, and the second shield sub-electrode 9 is disposed in a same layer as the pixel electrode 2 and electrically coupled to the common electrode line 5, and the second shield sub-electrode 9 is located in the pixel region.

In the present disclosure, by providing the second shield sub-electrode 9 between the pixel electrode 2 and the gate line 6, disposing the second shield sub-electrode 9 in a same layer as the pixel electrode 2 and electrically coupling the second shield sub-electrode 9 to the common electrode line 5, a planar electric field (parallel to the plane in which the pixel electrode 2 is located) may be formed between the second shield sub-electrode 9 and the pixel electrode 2, the planar electric field can effectively eliminate the influence of the fringe electric field formed between the pixel electrode 2 and the gate line 6 on the liquid crystal molecules, thereby improving the chaos in electric field at the edge of the area of the pixel region 1 between the pixel electrode 2 and the gate line 6, which is advantageous for reducing light leakage and increasing the aperture ratio.

As a specific implementation, a common electrode is further disposed in the pixel region 1, and the common electrode 3 is electrically coupled to the common electrode line 5 through a via hole, and the second shield sub-electrode 9 is coupled to the common electrode 3. More specifically, in a case where the common electrode 3 is disposed in a same layer as the pixel electrode 2, the second shield sub-electrode 9 is directly coupled to the common electrode 3, in a case where the common electrode 3 and the pixel electrode 2 are disposed in different layers, the second shield sub-electrode 9 is coupled to the common electrode 3 through a via hole.

It should be noted that the foregoing second shield sub-electrode 9 being coupled to the common electrode to realize electrical connection with the common electrode line 5 is a specific implementation in the embodiment, and does not limit the technical solution of the present disclosure. In the present disclosure, the second shield sub-electrode may also be coupled to the common electrode line 5 through a via hole (which is not shown in figures).

Continuing to refer to FIG. 3, in the present embodiment, not only the second shield sub-electrode 9 but also the first shield sub-electrode 7 in the embodiment described above with reference to FIG. 2 may be disposed in the pixel region 1, that is, the signal wire in the present embodiment includes the gate line 6 and the common electrode line 5, in this case, not only the chaos in electric field at the edge of the area in the pixel region 1 between the pixel electrode 2 and the gate line 6 can be effectively improved, but also the chaos in electric field at the edge of the area of the pixel region 1 between the pixel electrode 2 and the common electrode line 5 is improved.

In some embodiments, both the common electrode 3 and the pixel electrode 2 are comb-shaped electrodes, and the common electrode 3 includes a plurality of first comb tooth portions 301 and a first connecting portion 302 connecting the first comb tooth portions 301 together, the pixel electrode 2 includes a plurality of second comb tooth portions 201 and a second connecting portion 202 connecting the second comb tooth portions 201 together, and the first comb tooth portions 301 and the second comb tooth portions 201 are alternately arranged.

In some embodiments, the shape of the first shield sub-electrode 7 is the same as the shape of the first comb tooth portion 301, and the shape of the second shield sub-electrode 9 is the same as the shape of the first comb tooth portion 301. In this case, both of a planar electric field formed between the first shield sub-electrode 7 and the pixel electrode 2 and a planar electric field formed between the second shield sub-electrode 9 and the pixel electrode 2 may be similar to or the same as the electric field between the first comb tooth portion 301 and the second comb tooth portion 201, thereby improving the uniformity of the light transmittance at every position of the pixel region 1.

Specifically, the first shield sub-electrode 7 is taken as an example. In a case where the array substrate is an array substrate in an In-Plane Switching (IPS) type display panel, the common electrode 3 and the pixel electrode 2 are disposed in a same layer, by arranging the shape and the arrangement direction of the first shield sub-electrode 7 to be the same as the shape and the arrangement direction of the first comb tooth portion 301, and arranging a distance between the first shield sub-electrode 7 and the second comb tooth portion 201 immediately adjacent to the first shield sub-electrode 7 to be equal to a distance between the first comb tooth portion 301 and the second comb tooth portion 201 immediately adjacent to the first comb tooth portion 301, so that the planar electric field formed between the first shield sub-electrode 7 and the pixel electrode 2 is identical to the planar electric field formed between the first comb tooth portion 301 and the second comb tooth portion 201, and the uniformity of the light transmittance at every position of the pixel region 1 is optimal.

In a case where the common electrode 3 and the pixel electrode 2 are disposed in different layers, for example, in an Advanced-Super Dimension Switching (ADS) type display panel, a Fringe Filed Switching (FFS) type display panel, etc., by arranging the shape of the shield sub-electrode 7 to be the same as the shape of the first comb tooth portion 301, the planar electric field between the first shield sub-electrode 7 and the pixel electrode 2 can be similar to the electric field between the first comb tooth portion 301 and the second comb tooth portion 201 to some extent, in this case, the uniformity of the light transmittance at every position of the pixel region 1 can be improved to some extent.

The principle that the shape of the second shield sub-electrode 9 is arranged to be the same as that of the first comb tooth portion 301 in the present embodiment to improve the uniformity of the light transmittance at every position of the pixel region 1 is the same as that described above, which will not be repeated here.

It should be noted that, in the present embodiment, the common electrode 3 may be disposed in a same layer as the pixel electrode 2 or in a different layer from the pixel electrode 2, which are all within the protection scope of the present disclosure.

Further, in a case where the common electrode 3 is disposed in a same layer as the pixel electrode 2, the first shield sub-electrode 7 and the common electrode 3 may be coupled to the common electrode line 5 through a same via hole 8, alternatively, the first shield sub-electrode 7 may be directly coupled to the common electrode 3, and the second shield sub-electrode 9 is directly coupled to the common electrode 3. In a case where the common electrode 3 and the pixel electrode 2 are disposed in different layers, the first shield sub-electrode 7 and the common electrode 3 are coupled to the common electrode line 5 through two different via holes respectively, alternatively, the first shield sub-electrode 7 is coupled to the common electrode 3 through a via hole, and the second shield sub-electrode 9 is coupled to the common electrode 3 through a via hole (which is not shown in the figures).

In some implementations, the pixel structure further includes a thin film transistor 10 having a gate coupled to the gate line 6, a source coupled to a corresponding data line 4, and a drain coupled to a corresponding pixel electrode 2.

Figure 4:
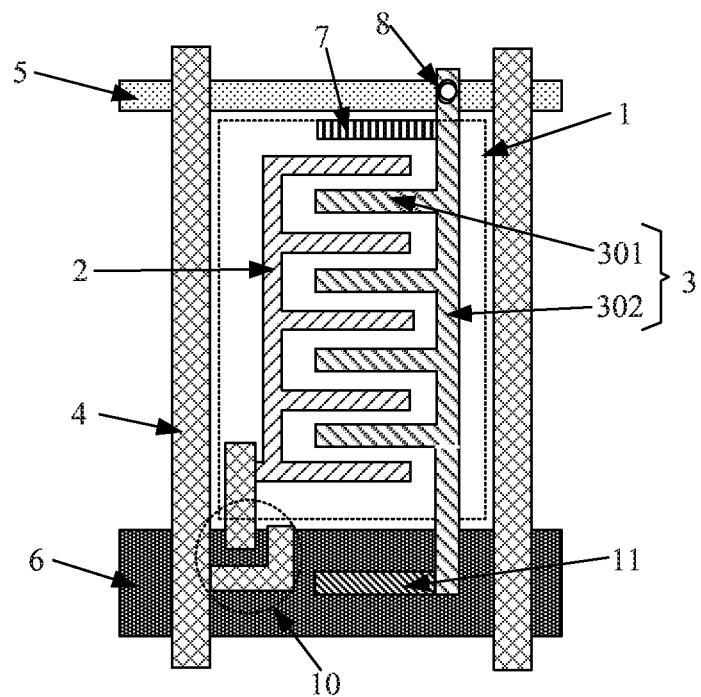
FIG. 4 is a top view of a pixel structure in an array substrate according to an embodiment of the present disclosure.

FIG. 4 is a top view of a pixel structure in an array substrate according to an embodiment of the present disclosure. As shown in FIG. 4, the signal wire in the present embodiment is the gate line 6, and the shield electrode at the side of the pixel electrode 2 proximal to the gate line 6 is a third shield sub-electrode 11, the third shield sub-electrode 11 and the pixel electrode 2 are provided in a same layer, an orthographic projection of the third shield sub-electrode 11 on the plane where the gate line 6 is located completely falls into an area where the gate line 6 is located, and the third shield sub-electrode 11 is electrically coupled to the common electrode 3.

Compared with the second shield sub-electrode 9 in the embodiment described above with reference to FIG. 3, an area covered by the planar electric field formed between the third shield sub-electrode 11 and the pixel electrode 2 in the present embodiment is larger, and the effect of improving the chaos in electric field between the electrode 2 and the gate line 6 is better.

In addition, since the third shield sub-electrode 11 is in an area covered by the gate line 6 (outside the pixel region 1), even if a fringe electric field is generated between the third shield sub-electrode 11 and the gate line 6, the fringe electric field is located outside the pixel region 1, it will not affect the display effect of the pixel region 1.

In some implementations, the shape and the arrangement direction of the third shield sub-electrode 11 is the same as the shape and the arrangement direction of the first comb tooth portion 301 respectively. In this case, a planar electric field generated between the third shield sub-electrode 11 and the pixel electrode 2 may be similar to or the same as the electric field between the first comb tooth portion 301 and the second comb tooth portion 201, thereby enhancing the uniformity of light transmittance at every position of the pixel region 1, the specific principle thereof can refer to the foregoing corresponding content, and details thereof are not described herein again.

Continuing to refer to FIG. 4, in the present embodiment, in addition to the third shield sub-electrode 11, the first shield sub-electrode 7 described above may also be provided in the pixel region 1, that is, in the present embodiment, the signal wire includes the gate line 6 and the common electrode line 5, and the chaos in electric field at the edge of the area of the pixel region 1 between the pixel electrode 2 and the gate line 6 can be effectively improved, and the chaos in electric field at the edge of the area of the pixel region 1 between the pixel electrode 2 and the common electrode line 5 can also be improved.

For the specific manner in which the third shield sub-electrode 11 and the common electrode line 5 are electrically coupled in the present embodiment, the manner in which the second shield sub-electrode 9 and the common electrode line 5 are coupled in the embodiment described above with reference to FIG. 3 can be referred to, and details thereof are not described herein again. For the specific manner in which the first shield sub-electrode 7 and the common electrode line 5 are coupled in the present embodiment, above corresponding content may be referred to, and details thereof are not described herein again.

It should be noted that the case where the pixel electrode 2 and the common electrode 3 shown in the above embodiments are comb-shaped is only exemplary, but not to limit the technical solution of the present disclosure. The common electrode 3 and the pixel electrode 2 in the present disclosure may also have other shapes, for example, a strip shape, a line shape, a spiral shape, and the like, which will not be exemplified herein.

Figure 5:
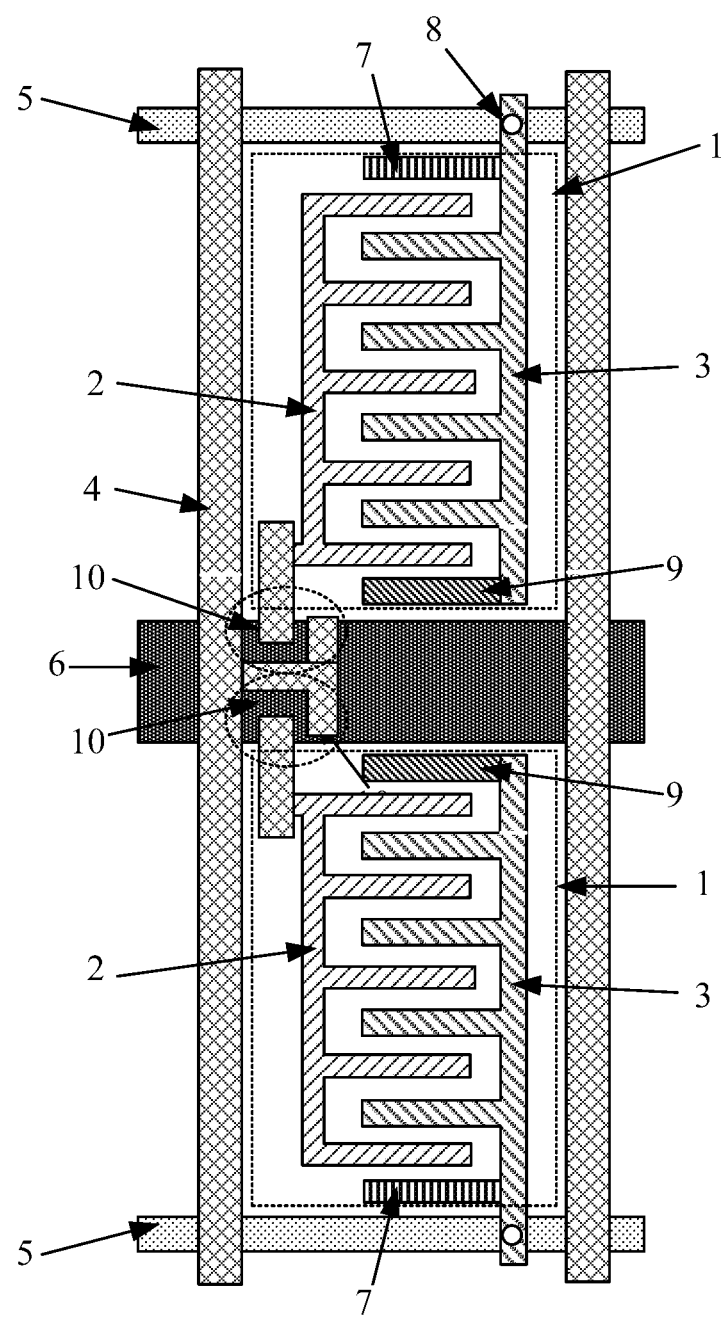
FIG. 5 is a top view of a pixel structure in an array substrate according to an embodiment of the present disclosure.

FIG. 5 is a top view of a pixel structure in an array substrate according to an embodiment of the present disclosure. As shown in FIG. 5, different from the embodiment described above with reference to FIG. 3, the pixel structure provided in the present embodiment includes two pixel regions 1, and a gate line 6 is located between the two pixel regions 1, that is, the two pixel regions 1 share one gate line 6, and a corresponding common electrode line 5 is provided at a side of each of the two pixel regions 1 opposite to the gate line 6.

The two pixel regions 1 are disposed along a first direction, and a data line 4 is provided at a side of the pixel region 1 parallel to the first direction, that is, the two pixel regions 1 share one data line 4.

The two pixel regions 1 in the present embodiment adopt the pixel region 1 in the embodiment described above with reference to FIG. 3, that is, each of the pixel regions 1 is provided with a first shield sub-electrode 7 and a second shield sub-electrode 9. For the description of the pixel region 1 in the present embodiment, reference may be made to the corresponding content in the embodiment described above with reference to FIG. 2, and details thereof are not described herein again.

It should be noted that the pixel structure in the present embodiment includes two thin film transistors 10, and the thin film transistors 10 correspond to the pixel regions 1 in one-to-one correspondence relationship, and gates of the two thin film transistors 10 are coupled to a single gate line 6.

Figures 6, 7:
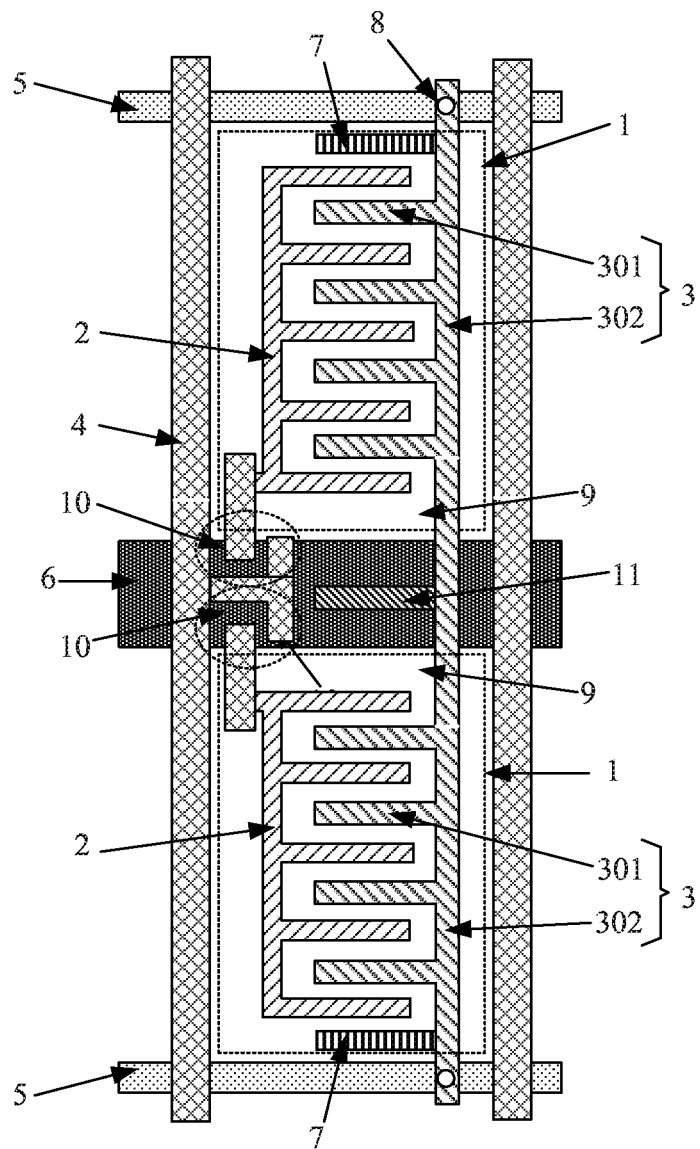
FIG. 6 is a top view of a pixel structure in an array substrate according to an embodiment of the present disclosure.
FIG. 7 is a flowchart of a manufacturing method of an array substrate according to an embodiment of the present disclosure.

FIG. 6 is a top view of a pixel structure in an array substrate according to an embodiment of the present disclosure. As shown in FIG. 6, different from the case where the pixel structure in the embodiment described above with reference to FIG. 5 includes the second shield sub-electrode 9, the pixel structure in the present embodiment includes a third shield sub-electrode 11, and the third shield sub-electrode 11 and the pixel electrode 2 are disposed in a single layer, and an orthographic projection of the third shield sub-electrode 11 on a plane where the gate line 6 is located completely falls into an area where the gate line 6 is located, and the third shield sub-electrode 11 is electrically coupled to the common electrode line.

For a detailed description of the third shield sub-electrode 11, reference may be made to the corresponding content in the embodiment described above with reference to FIG. 3, and details thereof are not described herein again.

It should be noted that, in the present embodiment, in order to enable the third shield sub-electrode 11 to be coupled to the common electrode 3, the common electrodes 3 (the second connection portions 302) in the two pixel regions 1 can be directly coupled at an area where the gate line 6 is located, and the third shield sub-electrode 11 is directly coupled to the common electrodes 3 at the area where the gate line 6 is located. In other words, in the present embodiment, the two pixel regions share the third shield sub-electrode 11.

In addition, in the above embodiment, only a case where one pixel structure includes one pixel region or two pixel regions is exemplarily shown, and broadly, the pixel structure in the present disclosure may include a plurality of pixel regions, which should be within the scope of protection of the present disclosure, and the case where one pixel structure includes a plurality of pixel regions will not be described in detail herein.

An embodiment of the present disclosure provides an array substrate, the array substrate includes a plurality of pixel structures, and at least one of the first shield sub-electrode, the second shield sub-electrode and the third shield sub-electrode is disposed in the pixel structure, effectively improving light leakage at the edge of the pixel region in the pixel structure, and increasing the pixel aperture ratio.

An embodiment of the present disclosure provides a display panel, which includes the array substrate in the above embodiments. For detailed description of the array substrate, details thereof are not described herein again.

The present disclosure also provides a manufacturing method of the array substrate in the above embodiment, wherein the array substrate includes a plurality of pixel structures, each of the pixel structure includes at least one pixel region, and the pixel region includes a pixel electrode, and a signal wire is provided at a side of the pixel region, as shown in FIG. 7, the manufacturing method includes the step 701: providing a shield electrode in a same layer as the pixel electrode at a side of the pixel electrode proximal to the signal wire, wherein the shield electrode is electrically coupled to the common electrode line.

In some implementations, the signal wire is a common electrode line, the shield electrode includes a first shield sub-electrode, and the manufacturing method further comprises: electrically coupling the first shield sub-electrode to the common electrode line through a via hole.

In some implementations, the signal wire is the gate line, the shield electrode includes a second shield sub-electrode, and the second shield sub-electrode is located in the pixel region, the pixel region further includes a common electrode, and the manufacturing method further includes: electrically coupling the common electrode to the common electrode line; and electrically coupling the second shield sub-electrode to the common electrode.

In some implementations, the signal wire is the gate line, the shield electrode comprises a third shield sub-electrode, and the third shield sub-electrode is located outside the pixel region, an orthographic projection of the third shield sub-electrode on a plane where the gate line is located is completely in an area where the gate line is located, and a common electrode is further provided in the pixel region, and the manufacturing method further comprises: electri-cally coupling the common electrode to the common electrode line; and electrically coupling the third shield sub-electrode to the common electrode.

The present disclosure has the following beneficial effects.

The present disclosure provides an array substrate and a display panel, wherein the array substrate includes: a plurality of pixel structures, each of the pixel structures comprises at least one pixel region, wherein a signal wire is provided at a side of the pixel region, and a pixel electrode is provided in the pixel region, a shield electrode being in a same layer as the pixel electrode is provided at a side of the pixel electrode proximal to the signal wire, and the shield electrode is electrically coupled to a common electrode line. The technical solution of the present disclosure provides a shield electrode between the pixel electrode and the signal wire, the shield electrode being disposed in a same layer as the pixel electrode and electrically coupled to the common electrode line, a planar electric field can be formed between the shield electrode and the pixel electrode, the planar electric field can effectively eliminate the fringe electric field formed between the pixel electrode and the signal wire to avoid the influence of the fringe electric field on the liquid crystal molecules, thereby improving the chaos in electric field at the edge of the area of the pixel region between the pixel electrode and the signal wire, and it is beneficial to reduce light leakage and increase the aperture ratio.

It should be understood that, the foregoing embodiments are only exemplary embodiments used for explaining the principle of the present disclosure, but the present disclosure is not limited thereto. Various variations and modifications may be made by a person skilled in the art without departing from the spirit and essence of the present disclosure, and these variations and modifications also fall into the protection scope of the present disclosure.

What is claimed is:

1. An array substrate, comprising: a plurality of pixel structures, each of the pixel structures comprises at least one pixel region, wherein a signal wire is provided at a side of the pixel region, and
a pixel electrode is provided in the pixel region, a shield electrode being in a same layer as the pixel electrode is provided at a side of the pixel electrode proximal to the signal wire, and the shield electrode is electrically coupled to a common electrode line, and wherein
the common electrode and the pixel electrode each are comb-shaped electrodes, and the common electrode comprises a plurality of first comb tooth portions and a first connecting portion connecting the first comb tooth portions together, the pixel electrode comprises a plurality of second comb tooth portions and a second connecting portion connecting the second comb tooth portions together, the first comb tooth portions and the second comb tooth portions are alternately arranged, and a shape and an arrangement direction of the shield electrode are the same as a shape and an arrangement direction of the first comb tooth portions respectively,
an orthographic projection of the shield electrode on a plane where the signal wire is located is between an orthographic projection of the first comb tooth portion of the pixel electrode closest to the signal wire on the plane where the signal wire is located and the signal wire,
an orthographic projection of the common electrode line on a plane where the signal wire is located is in parallel to an orthographic projection of the signal wire on the plane where the signal wire is located, and the signal wire comprises a gate line and the common electrode line, and a distance between the shield electrode and the second comb tooth portion immediately adjacent to the shield electrode is equal to a distance between the first comb tooth portion and the second comb tooth portion immediately adjacent to the first comb portion.

2. The array substrate according to claim 1, wherein the signal wire is the common electrode line, and the shield electrode comprises a first shield sub-electrode, and the first shield sub-electrode is coupled to the common electrode line through a via hole.

3. The array substrate according to claim 1, wherein the signal wire is the gate line, the shield electrode comprises a second shield sub-electrode located in the pixel region;

the pixel region further comprises a common electrode, and the common electrode is electrically coupled to the common electrode line; and the second shield sub-electrode is electrically coupled to the common electrode.

4. The array substrate according to claim 1, wherein the signal wire is the gate line, the shield electrode comprises a third shield sub-electrode, an orthographic projection of the third shield sub-electrode on a plane where the gate line is located is completely in an area where the gate line is located;

the pixel region further comprises a common electrode, and the common electrode is electrically coupled to the common electrode line; and the third shield sub-electrode is electrically coupled to the common electrode.

5. The array substrate according to claim 1, wherein the signal wire comprises the common electrode line and the gate line, the shield electrode comprises a first shield sub-electrode and a second shield sub-electrode, the first shield sub-electrode is coupled to the common electrode line through a via hole, and the second shield sub-electrode is located in the pixel region;

the pixel region further comprises a common electrode, and the common electrode is electrically coupled to the common electrode line; and the second shield sub-electrode is electrically coupled to the common electrode.

6. The array substrate according to claim 1, wherein the signal wire comprises the common electrode line and the gate line, the shield electrode comprises a first shield sub-electrode and a third shield sub-electrode, the first shield sub-electrode is coupled to the common electrode line through a via hole, and an orthographic projection of the third shield sub-electrode on a plane where the gate line is located is completely within an area where the gate line is located;

the pixel region further comprises a common electrode, and the common electrode is electrically coupled to the common electrode line; and the third shield sub-electrode is electrically coupled to the common electrode.

7. The array substrate according to claim 3, wherein the common electrode is in a same layer as the pixel electrode, and the shield electrode is directly coupled to the common electrode.

8. The array substrate according to claim 1, wherein the pixel structure comprises two pixel regions and a gate line between the two pixel regions, and the two pixel regions share the gate line.

9. The array substrate according to claim 1, wherein the pixel structure comprises two pixel regions, and the two pixel regions are disposed along a first direction;

a data line is provided at a side of the pixel region parallel to the first direction, and the two pixel regions share the data line.

10. The array substrate according to claim 1, wherein the pixel electrode is a comb-shaped electrode.

11. The array substrate according to claim 1, further comprising at least one thin film transistor corresponding to the at least one pixel region in one-to-one correspondence relationship.

12. A display panel, comprising the array panel according to claim 1.

13. A manufacturing method of the array substrate according to claim 1, comprising:

providing the shield electrode in a same layer as the pixel electrode at a side of the pixel electrode proximal to the signal wire, wherein the shield electrode is electrically coupled to the common electrode line.

14. The manufacturing method according to claim 13, wherein the signal wire is the common electrode line, the shield electrode comprises a first shield sub-electrode, and the manufacturing method further comprises:

electrically coupling the first shield sub-electrode to the common electrode line through a via hole.

15. The manufacturing method according to claim 13, wherein the signal wire is the gate line, the shield electrode comprises a second shield sub-electrode, and the second shield sub-electrode is located in the pixel region, the pixel region further comprises a common electrode, and the manufacturing method further comprises:

electrically coupling the common electrode to the common electrode line; and electrically coupling the second shield sub-electrode to the common electrode.

16. The manufacturing method according to claim 13, wherein the signal wire is the gate line, the shield electrode comprises a third shield sub-electrode, and the third shield sub-electrode is located outside the pixel region, an orthographic projection of the third shield sub-electrode on a plane where the gate line is located is completely in an area where the gate line is located, and the pixel region further comprises a common electrode, and the manufacturing method further comprises:

electrically coupling the common electrode to the common electrode line; and electrically coupling the third shield sub-electrode to the common electrode.

17. The manufacturing method according to claim 13, wherein the signal wire comprises the common electrode line and the gate line, the shield electrode comprises a first shield sub-electrode and a second shield sub-electrode, the second shield sub-electrode is located in the pixel region, the pixel region further comprises a common electrode, and the manufacturing method further comprises:

coupling the first shield sub-electrode to the common electrode line through a via hole;

electrically coupling the common electrode to the common electrode line; and electrically coupling the second shield sub-electrode to the common electrode.

18. The manufacturing method according to claim 13, wherein the signal wire comprises the common electrode line and the gate line, the shield electrode comprises a first shield sub-electrode and a third shield sub-electrode, an orthographic projection of the third shield sub-electrode on a plane where the gate line is located is completely in an area where the gate line is located, and the pixel region further comprises a common electrode, and the manufacturing method further comprises:
- electrically coupling the first shield sub-electrode to the common electrode line through a via hole;
- electrically coupling the common electrode to the common electrode line; and
- electrically coupling the third shield sub-electrode to the common electrode.

* * * * *